(12) United States Patent
Hammerschmidt

(10) Patent No.: US 7,969,041 B2
(45) Date of Patent: Jun. 28, 2011

(54) SYSTEM WHERE THE NUMBER OF CONDUCTORS EQUALS THE NUMBER OF SENSORS AND EACH OF THE SENSORS RECEIVES VOLTAGES VIA A DIFFERENT SET OF TWO CONDUCTORS AND PROVIDES DATA VIA THE DIFFERENT SET OF TWO CONDUCTORS

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 178 days.

(21) Appl. No.: 12/364,910

(22) Filed: Feb. 3, 2009

(65) Prior Publication Data

US 2010/0194193 A1 Aug. 5, 2010

(51) Int. Cl.
*G01R 31/28* (2006.01)
*B60L 1/00* (2006.01)
(52) U.S. Cl. .................. 307/10.1; 307/9.1; 307/42
(58) Field of Classification Search .......... 307/9.1, 307/10.1, 42
See application file for complete search history.

(56) References Cited

U.S. PATENT DOCUMENTS

| | | | |
|---|---|---|---|
| 6,141,195 A | 10/2000 | Buehring et al. | |
| 6,437,581 B1 * | 8/2002 | Blossfeld | 324/600 |
| 6,865,460 B2 | 3/2005 | Bray et al. | |
| 6,897,639 B2 * | 5/2005 | Koernle et al. | 323/277 |
| 7,304,567 B2 | 12/2007 | Canfield | |
| 7,424,031 B2 | 9/2008 | Binder | |
| 7,487,022 B2 * | 2/2009 | Glaser | 701/45 |
| 7,719,411 B2 * | 5/2010 | Averitt | 340/439 |
| 2002/0027347 A1 * | 3/2002 | Fujita | 280/735 |
| 2003/0052657 A1 * | 3/2003 | Koernle et al. | 323/282 |
| 2003/0184447 A1 * | 10/2003 | Otterbach et al. | 340/854.9 |
| 2006/0082220 A1 | 4/2006 | Karam et al. | |
| 2009/0021221 A1 | 1/2009 | Krauer et al. | |

FOREIGN PATENT DOCUMENTS

DE 19800049 A1 7/1999

* cited by examiner

*Primary Examiner* — Jared J Fureman
*Assistant Examiner* — Adi Amrany
(74) *Attorney, Agent, or Firm* — Dicke, Billig & Czaja, PLLC

(57) ABSTRACT

A system includes a control circuit, supply circuits, and sensors. The control circuit controls the supply circuits to power each of the sensors and obtain data from the powered sensors. If one of the supply conductors is open, the control circuit controls the supply circuits to power each of the sensors and obtain data from the powered sensors. If one of the sensors is shorted, the control circuit controls the supply circuits to power each of the remaining sensors and obtain data from the powered sensors.

23 Claims, 5 Drawing Sheets

SYSTEM WHERE THE NUMBER OF CONDUCTORS EQUALS THE NUMBER OF SENSORS AND EACH OF THE SENSORS RECEIVES VOLTAGES VIA A DIFFERENT SET OF TWO CONDUCTORS AND PROVIDES DATA VIA THE DIFFERENT SET OF TWO CONDUCTORS

BACKGROUND

Sensors are used in innumerable systems, such as systems in automobiles, other machines, aerospace, medicine, manufacturing and robotics. Sensors measure physical parameters and convert them into signals that can be read by an observer or electronics.

Automobiles include sensors in systems that are critical for the safe operation of the vehicle. These critical systems include control systems and safety systems, such as electronic power steering (EPS) and vehicle stability control (VSC) systems. Often, these critical systems employ redundant sensors for gathering data on the same parameter. For example, a steering sensor system may include redundant steering angle sensors and/or redundant steering incremental speed sensors that provide data to the EPS and/or VSC systems.

Typically, a sensor is connected to one or more circuits, such as supply circuits and a control circuit, via wires that extend from the sensor to the circuits. The sensor can be connected to the circuits via a controller area network (CAN) bus or point-to-point connections. Usually, a CAN bus includes six wires for providing power to a sensor and communicating with the sensor. In addition, each CAN bus includes a CAN receiver that adds cost to the final product. Point-to-point connections include two and three wire per sensor connections, where data can be communicated via current modulation in a two wire per sensor system and data can be communicated via voltage in a three wire per sensor system. In all of these systems, wires, including wires for redundant sensors, add cost and weight to the final product.

For these and other reasons, there is a need for the present invention.

SUMMARY

One embodiment described in the disclosure provides a system including circuits, conductors and sensors. The circuits are configured to supply voltages. The conductors are configured to receive the supply voltages and the sensors are configured to provide data. Each of the sensors is configured to receive the supply voltages via a different set of two of the conductors and provide data via the different set of two of the conductors. The number of conductors is equal to the numbers of sensors or one more than the number of sensors.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
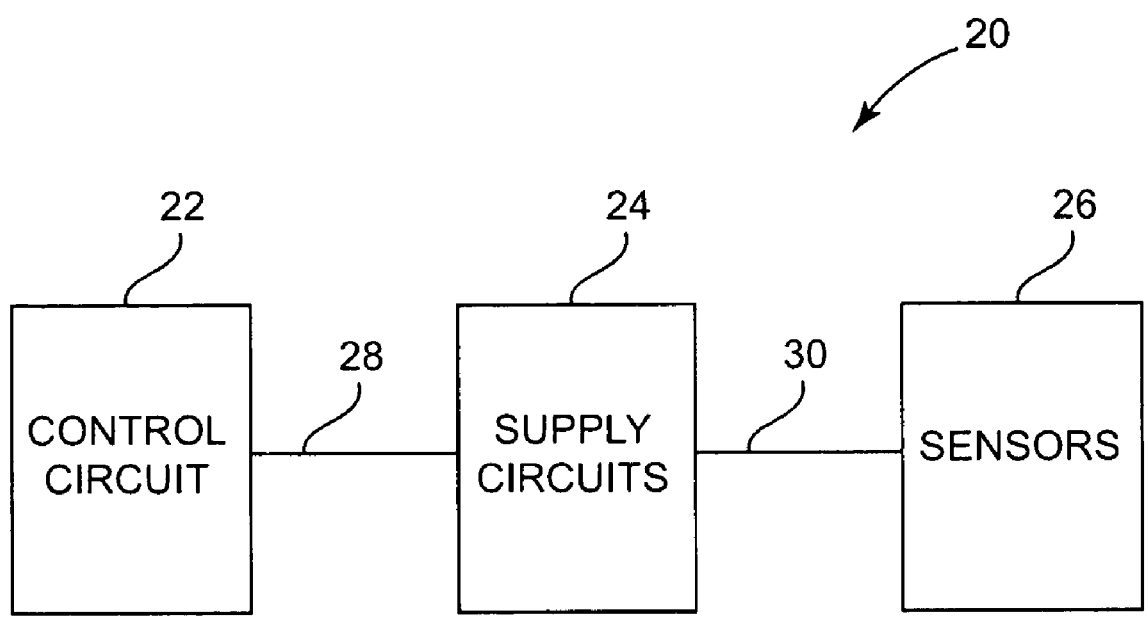
FIG. 1 is a diagram illustrating one embodiment of a system.

FIG. 1 is a diagram illustrating one embodiment of a system 20 that includes a control circuit 22, supply circuits 24 and sensors 26. Control circuit 22 is electrically coupled to supply circuits 24 via communications path 28. Supply circuits 24 are electrically coupled to sensors 26 via supply conductors 30. Control circuit 22 controls supply circuits 24 to power sensors 26 and obtain data from sensors 26. Control circuit 22 controls supply circuits 24 via communications path 28. Supply circuits 24 power sensors 26 and obtain data from sensors 26 via supply conductors 30. The received data can be transmitted to control circuit 22 via communications path 28.

In one embodiment, system 20 is a system in an automobile. In one embodiment, system 20 is a critical system. In one embodiment, system 20 is a control system and/or a safety system. In one embodiment, system 20 is an EPS system and/or a VSC system. In one embodiment, system 20 is a steering sensor system. In other embodiments, system 20 is another suitable system, such as a system in another machine or a system in an aerospace, medicine, manufacturing or robotics application.

Control circuit 22 controls supply circuits 24 to power each of the sensors 26 and obtain data from the powered sensors 26. If one of the sensors 26 is shorted, control circuit 22 controls supply circuits 24 to power each of the remaining sensors 26 and obtain data from the powered sensors 26. Also, if one of the supply conductors 30 is open, control circuit 22 controls supply circuits 24 to power each of the sensors 26 and obtain data from the powered sensors 26. In one embodiment, control circuit 22 is an electronic control unit (ECU). In one embodiment, control circuit 22 is a controller. In one embodiment, control circuit 22 is control logic.

Supply circuits 24 provide supply voltages that are received by supply conductors 30. Supply circuits 24 provide high and low supply voltages. In one embodiment, supply circuits 24 provide a 5 volt high voltage and a 0 volt low voltage. In other embodiments, supply circuits 24 provide high and low voltages of any suitable value.

Sensors 26 receive the supply voltages via supply conductors 30 and provide data via supply conductors 30. Each of the sensors 26 receives supply voltages and provides data via a different set of two of the supply conductors 30. The number of supply conductors 30 is equal to either the number of sensors 26 or one more than the number of sensors 26. In one embodiment, the number of sensors 26 is equal to at least three sensors 26. In one embodiment, the number of supply conductors 30 is equal to the number of sensors 26 if the number of sensors 26 is an even number and the number of supply conductors 30 is equal to one more than the number of sensors 26 if the number of sensors 26 is an odd number. In one embodiment, each of the sensors 26 is an integrated circuit chip.

Each of the sensors 26 provides data that corresponds to the parameter it monitors. In one embodiment, at least two of the sensors 26 sense the same parameter and provide redundant data. In one embodiment, sensors 26 are automotive sensors. In one embodiment, sensors 26 include steering angle sensors. In one embodiment, sensors 26 include steering incremental speed sensors. In one embodiment, sensors 26 provide data for a VSC system. In one embodiment, sensors 26 provide data for an EPS system.

Each of the sensors 26 provides data via current modulation over at least one conductor of the different set of two supply conductors 30. In one embodiment, each of the sensors 26 provides data via modulation of current over the conductor of the different set of two supply conductors 30 that supplies a high voltage to the sensor. In one embodiment, each of the sensors 26 provides data via modulation of current over the conductor of the different set of two supply conductors 30 that supplies a low voltage to the sensor.

Figure 2:
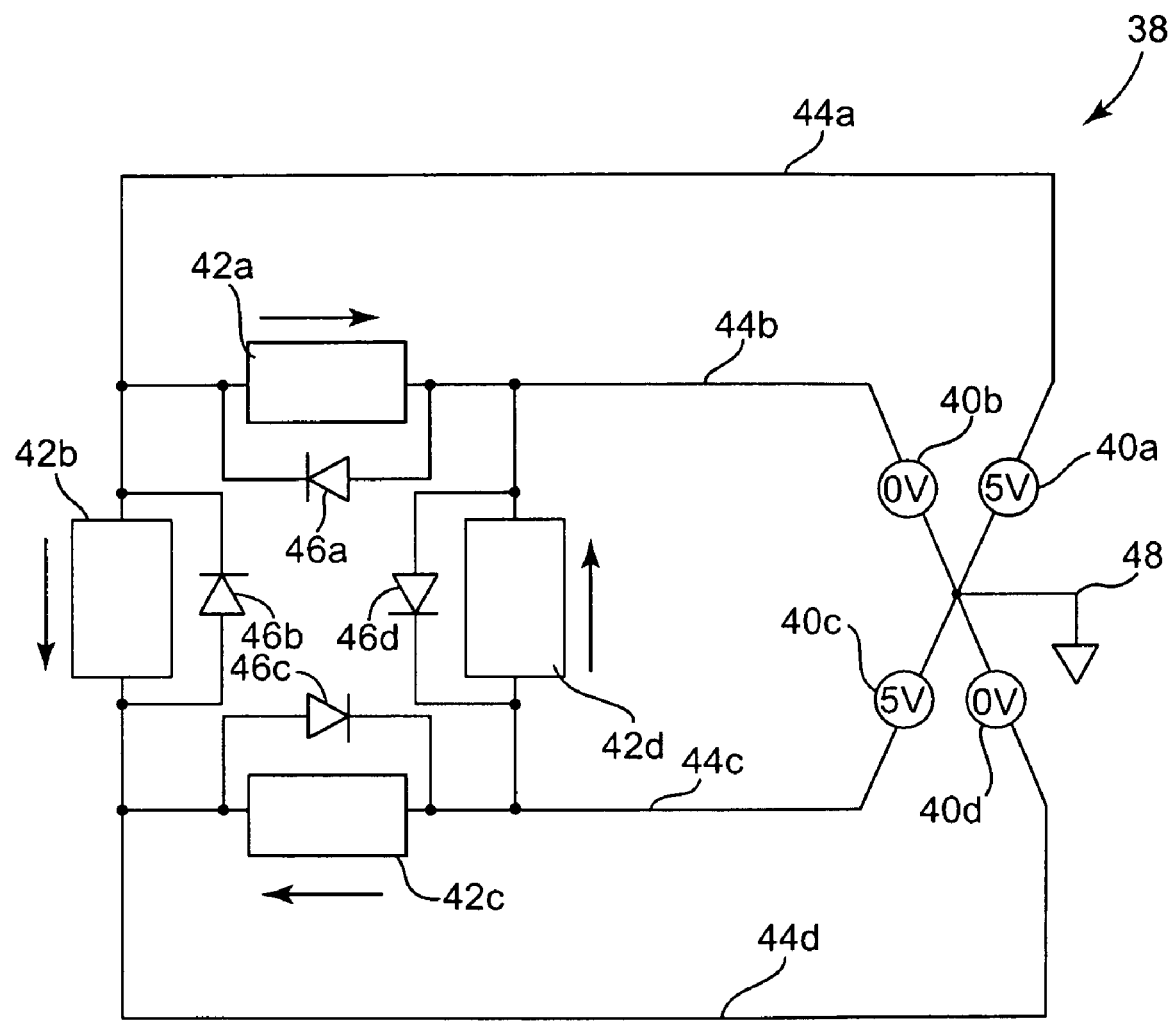
FIG. 2 is a diagram illustrating one embodiment of a circuit that includes supply circuits, sensors, supply conductors and diodes.

FIG. 2 is a diagram illustrating one embodiment of a circuit 38 that includes supply circuits 40a-40d, sensors 42a-42d, supply conductors 44a-44d and diodes 46a-46d. Each of the diodes 46a-46d is coupled across one of the sensors 42a-42d. Supply circuits 40a-40d are similar to supply circuits 24 (shown in FIG. 1). Sensors 42a-42d and diodes 46a-46d, in combination, are similar to sensors 26 (shown in FIG. 1). Supply conductors 44a-44d are similar to supply conductors 30 (shown in FIG. 1).

Supply circuits 40a-40d are electrically coupled to sensors 42a-42d and diodes 46a-46d via supply conductors 44a-44d. Supply circuit 40a is electrically coupled to one side of sensor 42a, one side of diode 46a, one side of sensor 42b and one side of diode 46b via supply conductor 44a. Supply circuit 40b is electrically coupled to the other side of sensor 42a, the other side of diode 46a, one side of sensor 42d and one side of diode 46d via supply conductor 44b. Supply circuit 40c is electrically coupled to the other side of sensor 42d, the other side of diode 46d, one side of sensor 42c and one side of diode 46c via supply conductor 44c. Supply circuit 40d is electrically coupled to the other side of sensor 42b, the other side of diode 46b, the other side of sensor 42c and the other side of diode 46c via supply conductor 44d. Also, each of the supply circuits 40a-40d is electrically coupled to a reference, such as ground, at 48.

Each of the diodes 46a-46d corresponds to one of the sensors 42a-42d. Diode 46a corresponds to sensor 42a, diode 46b corresponds to sensor 42b, diode 46c corresponds to sensor 42c and diode 46d corresponds to sensor 42d. In one embodiment, each of the diodes 46a-46d and the corresponding one of the sensors 42a-42d are part of the same integrated circuit chip. In one embodiment, each of the diodes 46a-46d is external to the corresponding one of the sensors 42a-42d. In one embodiment, each of the diodes 46a-46d is internal to or part of the corresponding one of the sensors 42a-42d. In one embodiment, each of the diodes 46a-46d is a substrate diode. In one embodiment, each of the diodes 46a-46d is a substrate diode internal to the corresponding one of the sensors 42a-42d. In one embodiment, each of the diodes 46a-46d is a substrate diode internal to or part of the corresponding one of the sensors 42a-42d and produced in a complementary metal oxide semiconductor (CMOS) process. In one embodiment, each of the diodes 46a-46d is a substrate diode that uses the substrate as an anode. In one embodiment, each of the diodes 46a-46d is a substrate diode that uses the substrate as a cathode. In one embodiment, at least one of the diodes 46a-46d is an external diode and at least one of the diodes 46a-46d is an internal diode. In one embodiment, the substrate is silicon.

A control circuit, such as control circuit 22 (shown in FIG. 1), controls supply circuits 40a-40d to power sensors 42a-42d and obtain data from sensors 42a-42d. Supply circuits 40a-40d provide supply voltages to sensors 42a-42b via supply conductors 44a-44d and sensors 42a-42b provide data to supply circuits 40a-40d via supply conductors 44a-44d.

To power sensor 42a, supply circuit 40a provides a high voltage of 5 volts to one side of sensor 42a via supply conductor 44a and supply circuit 40b provides a low voltage of 0 volts to the other side of sensor 42a via supply conductor 44b. The diode 46a across the powered sensor 42a is reverse biased by the supply voltages and current flows through the powered sensor 42a in the direction indicated by the arrow, from the high voltage of 5 volts to the low voltage of 0 volts. Sensor 42a provides data via modulation of current over the set of two supply conductors 44a and 44b.

To power sensor 42b, supply circuit 40a provides a high voltage of 5 volts to one side of sensor 42b via supply conductor 44a and supply circuit 40d provides a low voltage of 0 volts to the other side of sensor 42b via supply conductor 44d. The diode 46b across the powered sensor 42b is reverse biased by the supply voltages and current flows through the powered sensor 42b in the direction indicated by the arrow, from the high voltage of 5 volts to the low voltage of 0 volts. Sensor 42b provides data via modulation of current over the set of two supply conductors 44a and 44d.

To power sensor 42c, supply circuit 40c provides a high voltage of 5 volts to one side of sensor 42c via supply conductor 44c and supply circuit 40d provides a low voltage of 0 volts to the other side of sensor 42c via supply conductor 44d. The diode 46c across the powered sensor 42c is reverse biased by the supply voltages and current flows through the powered sensor 42c in the direction indicated by the arrow, from the high voltage of 5 volts to the low voltage of 0 volts. Sensor 42c provides data via modulation of current over the set of two supply conductors 44c and 44d.

To power sensor 42d, supply circuit 40c provides a high voltage of 5 volts to one side of sensor 42d via supply conductor 44c and supply circuit 40b provides a low voltage of 0 volts to the other side of sensor 42d via supply conductor 44b. The diode 46d across the powered sensor 42d is reverse biased by the supply voltages and current flows through the powered sensor 42d in the direction indicated by the arrow, from the high voltage of 5 volts to the low voltage of 0 volts. Sensor 42d provides data via modulation of current over the set of two supply conductors 44b and 44c.

Each of the sensors 42a-42d is electrically coupled to a different set of two of the supply circuits 40a-40d and a different set of two of the supply conductors 44a-44d. There are four supply circuits 40a-40d, four sensors 42a-42d and four supply conductors 44a-44d, such that the number of supply conductors 44a-44d (four) is equal to the number of sensors 42a-42d (four).

In another embodiment, the number of sensors 42 is reduced to three and the number of supply conductors 44 remains at four, such that the number of supply conductors 44 (four) is equal to one more than the number of sensors 42 (three). Also, the number of supply circuits 40 remains equal to the number of supply conductors 44 (four). The circuit is the same as circuit 38 of FIG. 2, with the exception that one of the sensors 42a-42d has been removed.

In other embodiments, the number of sensors 42 can be any suitable number of sensors 42, where the number of supply conductors 44 is either equal to the number of sensors 42 or one more than the number of sensors 42. For example, if the number of sensors 42 is six, the circuit topology is a hexagon. The six sensors 42 are situated with one sensor 42 between each of the two corners of the hexagon and a different supply conductor 44 connected to each of the corners of the hexagon. Also, a different supply circuit 40 is attached to each of the supply conductors 44.

Circuit 38 includes four supply circuits 40a-40d and four supply conductors 44a-44d for powering and obtaining data from four sensors 42a-42d. This is a reduction of one half of the wires in a two wire per sensor system. Also, in circuit 38, if one of the sensors 42a-42d is shorted out, data can still be obtained from the remaining sensors 42 and if one of the supply conductors 44a-44d is open, data can still be obtained from all of the sensors 42a-42d.

Figure 3:
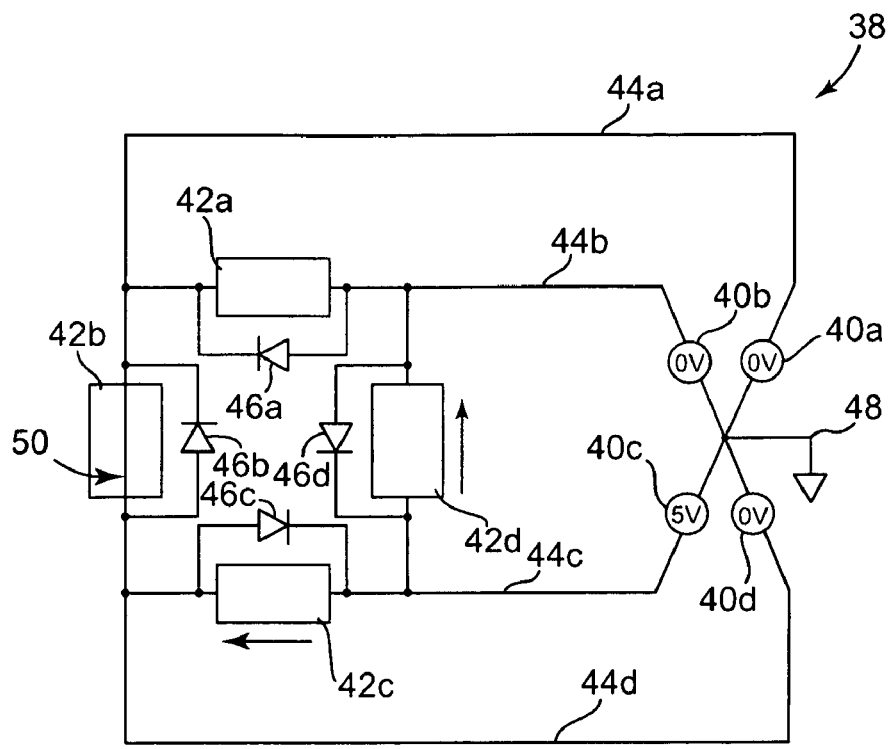
FIG. 3 is a diagram illustrating one embodiment of a circuit with a shorted sensor and supply circuits switched to power and obtain data from a first set of two sensors.

FIG. 3 is a diagram illustrating one embodiment of circuit 38, which is similar to circuit 38 of FIG. 2 with the exceptions that sensor 42b is shorted at 50 and supply circuits 40a-40d are switched to power and obtain data from sensors 42c and 42d. A control circuit, such as control circuit 22 (shown in FIG. 1), controls supply circuits 40a-40d to power and obtain data from sensors 42c and 42d.

To power sensor 42c, supply circuit 40c provides a high voltage of 5 volts to one side of sensor 42c via supply conductor 44c and supply circuit 40d provides a low voltage of 0 volts to the other side of sensor 42c via supply conductor 44d. In addition, supply circuit 40a provides a low voltage of 0 volts to the other side of sensor 42b via supply conductor 44a. This puts 0 volts across sensor 42b and diode 46b. Diode 46c across the powered sensor 42c is reverse biased by the supply voltages and current flows through the powered sensor 42c in the direction indicated by the arrow, from the high voltage of 5 volts to the low voltage of 0 volts. Sensor 42c provides data via modulation of current over the set of two supply conductors 44c and 44d. Also, some current may flow through shorted sensor 42b and supply conductor 44a.

To power sensor 42d, supply circuit 40c provides a high voltage of 5 volts to one side of sensor 42d via supply conductor 44c and supply circuit 40b provides a low voltage of 0 volts to the other side of sensor 42d via supply conductor 44b. The diode 46d across the powered sensor 42d is reverse biased by the supply voltages and current flows through the powered sensor 42d in the direction indicated by the arrow, from the high voltage of 5 volts to the low voltage of 0 volts. Sensor 42d provides data via modulation of current over the set of two supply conductors 44b and 44c.

Figure 4:
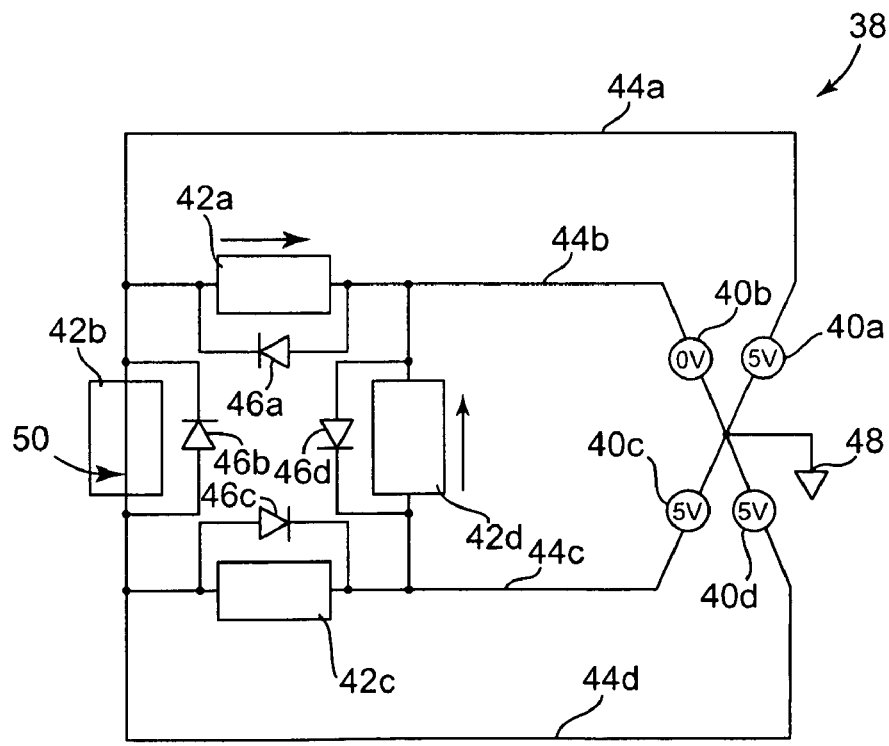
FIG. 4 is a diagram illustrating one embodiment of a circuit with a shorted sensor and supply circuits switched to power and obtain data from a second set of two sensors.

FIG. 4 is a diagram illustrating one embodiment of circuit 38, which is similar to circuit 38 of FIG. 2 with the exceptions that sensor 42b is shorted at 50 and supply circuits 40a-40d are switched to power and obtain data from sensors 42a and 42d. A control circuit, such as control circuit 22 (shown in FIG. 1), controls supply circuits 40a-40d to power and obtain data from sensors 42a and 42d.

To power sensor 42a, supply circuit 40a provides a high voltage of 5 volts to one side of sensor 42a via supply conductor 44a and supply circuit 40b provides a low voltage of 0 volts to the other side of sensor 42a via supply conductor 44b. In addition, supply circuit 40d provides a high voltage of 5 volts to the other side of sensor 42b via supply conductor 44d. This puts 0 volts across sensor 42b and diode 46b. Diode 46a across the powered sensor 42a is reverse biased by the supply voltages and current flows through the powered sensor 42a in the direction indicated by the arrow, from the high voltage of 5 volts to the low voltage of 0 volts. Sensor 42a provides data via modulation of current over the set of two supply conductors 44a and 44b. Also, some current may flow through shorted sensor 42b and supply conductor 44d.

To power sensor 42d, supply circuit 40c provides a high voltage of 5 volts to one side of sensor 42d via supply conductor 44c and supply circuit 40b provides a low voltage of 0 volts to the other side of sensor 42d via supply conductor 44b. The diode 46d across the powered sensor 42d is reverse biased by the supply voltages and current flows through the powered sensor 42d in the direction indicated by the arrow, from the high voltage of 5 volts to the low voltage of 0 volts. Sensor 42d provides data via modulation of current over the set of two supply conductors 44b and 44c.

Thus, if one of the sensors 42a-42d is shorted, the control circuit controls supply circuits 40a-40d to power the remaining sensors 42a-42d and exclude the shorted sensor. In other embodiments, the number of sensors can be more or less than four sensors, and the resulting circuit is flexible enough to overcome a shorted sensor and obtain data from the remaining sensors.

Figure 5:
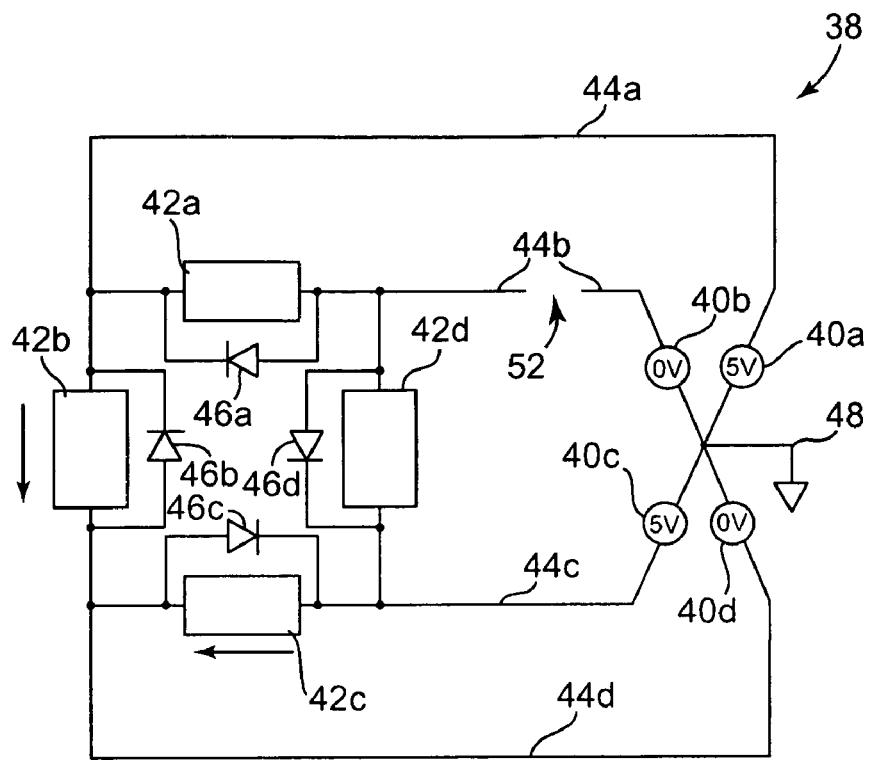
FIG. 5 is a diagram illustrating one embodiment of a circuit with an open supply conductor and supply circuits switched to power and obtain data from a first set of two sensors.

FIG. 5 is a diagram illustrating one embodiment of circuit 38, which is similar to circuit 38 of FIG. 2 with the exceptions that supply conductor 44b is open at 52 and supply circuits 40a-40d are switched to power and obtain data from sensors 42b and 42c. A control circuit, such as control circuit 22 (shown in FIG. 1), controls supply circuits 40a-40d to power and obtain data from sensors 42b and 42c.

To power sensor 42b, supply circuit 40a provides a high voltage of 5 volts to one side of sensor 42b via supply conductor 44a and supply circuit 40d provides a low voltage of 0 volts to the other side of sensor 42b via supply conductor 44d. Supply circuit 40c provides a high voltage of 5 volts to sensors 42c and 42d via supply conductor 44c, which puts 0 volts across sensors 42a and 42d from supply conductor 44a to supply conductor 44c. Diode 46b across the powered sensor 42b is reverse biased by the supply voltages and current flows through the powered sensor 42b in the direction indicated by the arrow, from the high voltage of 5 volts to the low voltage of 0 volts. Sensor 42b provides data via modulation of current over the set of two supply conductors 44a and 44d.

To power sensor 42c, supply circuit 40c provides a high voltage of 5 volts to one side of sensor 42c via supply conductor 44c and supply circuit 40d provides a low voltage of 0 volts to the other side of sensor 42c via supply conductor 44d. Supply circuit 40a provides a high voltage of 5 volts to sensors 42a and 42b via supply conductor 44a, which puts 0 volts across sensors 42a and 42d from supply conductor 44a to supply conductor 44c. Diode 46c across the powered sensor 42c is reverse biased by the supply voltages and current flows through the powered sensor 42c in the direction indicated by the arrow, from the high voltage of 5 volts to the low voltage of 0 volts. Sensor 42c provides data via modulation of current over the set of two supply conductors 44c and 44d.

Figure 6:
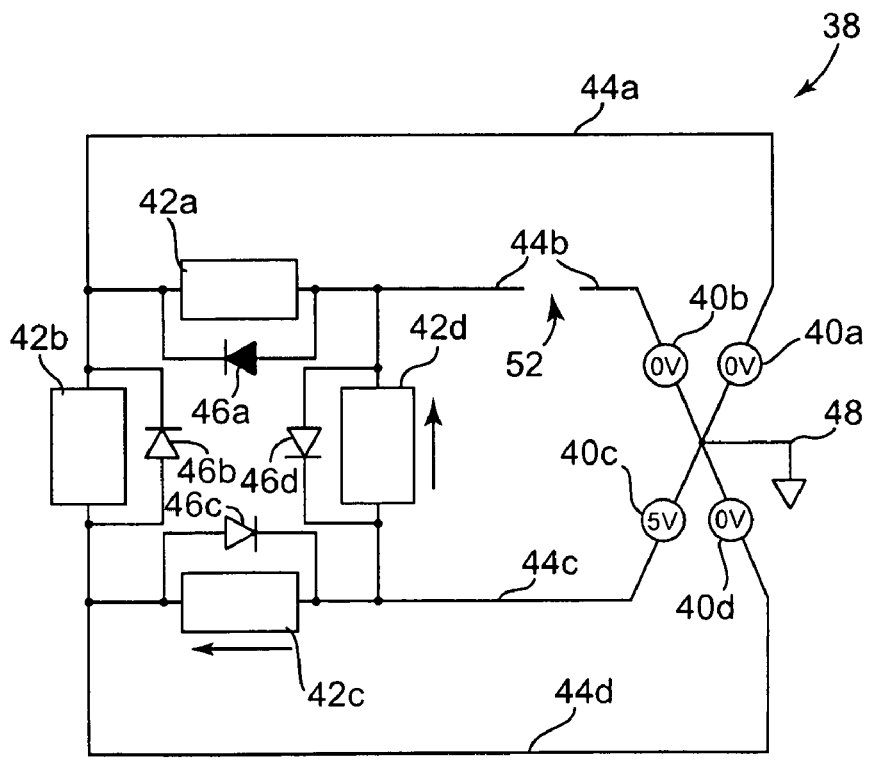
FIG. 6 is a diagram illustrating one embodiment of a circuit with an open supply conductor and supply circuits switched to power and obtain data from a second set of two sensors.

FIG. 6 is a diagram illustrating one embodiment of circuit 38, which is similar to circuit 38 of FIG. 2 with the exceptions that supply conductor 44b is open at 52 and supply circuits 40a-40d are switched to power and obtain data from sensors 42c and 42d. A control circuit, such as control circuit 22 (shown in FIG. 1), controls supply circuits 40a-40d to power and obtain data from sensors 42c and 42d.

To power sensor 42c, supply circuit 40c provides a high voltage of 5 volts to one side of sensor 42c via supply conductor 44c and supply circuit 40d provides a low voltage of 0 volts to the other side of sensor 42c via supply conductor 44d. Supply circuit 40a provides a low voltage of 0 volts to sensors 42a and 42b via supply conductor 44a, which puts 0 volts across sensor 42b from supply conductor 44a to supply conductor 44d. Diode 46c across the powered sensor 42c is reverse biased by the supply voltages and current flows through the powered sensor 42c in the direction indicated by the arrow, from the high voltage of 5 volts to the low voltage of 0 volts. Sensor 42c provides data via modulation of current over the set of two supply conductors 44c and 44d.

To power sensor 42d, supply circuit 40c provides a high voltage of 5 volts to one side of sensor 42d via supply conductor 44c and supply circuit 40a provides a low voltage of 0 volts to sensors 42a and 42b via supply conductor 44a. Supply circuit 40d provides a low voltage of 0 volts to sensors 42b and 42c via supply conductor 44d, which puts 0 volts across sensor 42b from supply conductor 44a to supply conductor 44d. Diode 46d across the powered sensor 42d is reverse biased by the supply voltages and diode 46a is forward biased. Current flows through the powered sensor 42d in the direction indicated by the arrow and through diode 46a, from the high voltage of 5 volts at 44c to the low voltage of 0 volts at 44a. Sensor 42d provides data via modulation of current over the set of two supply conductors 44c and 44a. In one embodiment, the voltage drop across sensor 42d is substantially 4.5 volts and the voltage drop across diode 46a is substantially 0.5 volts.

Figure 7:
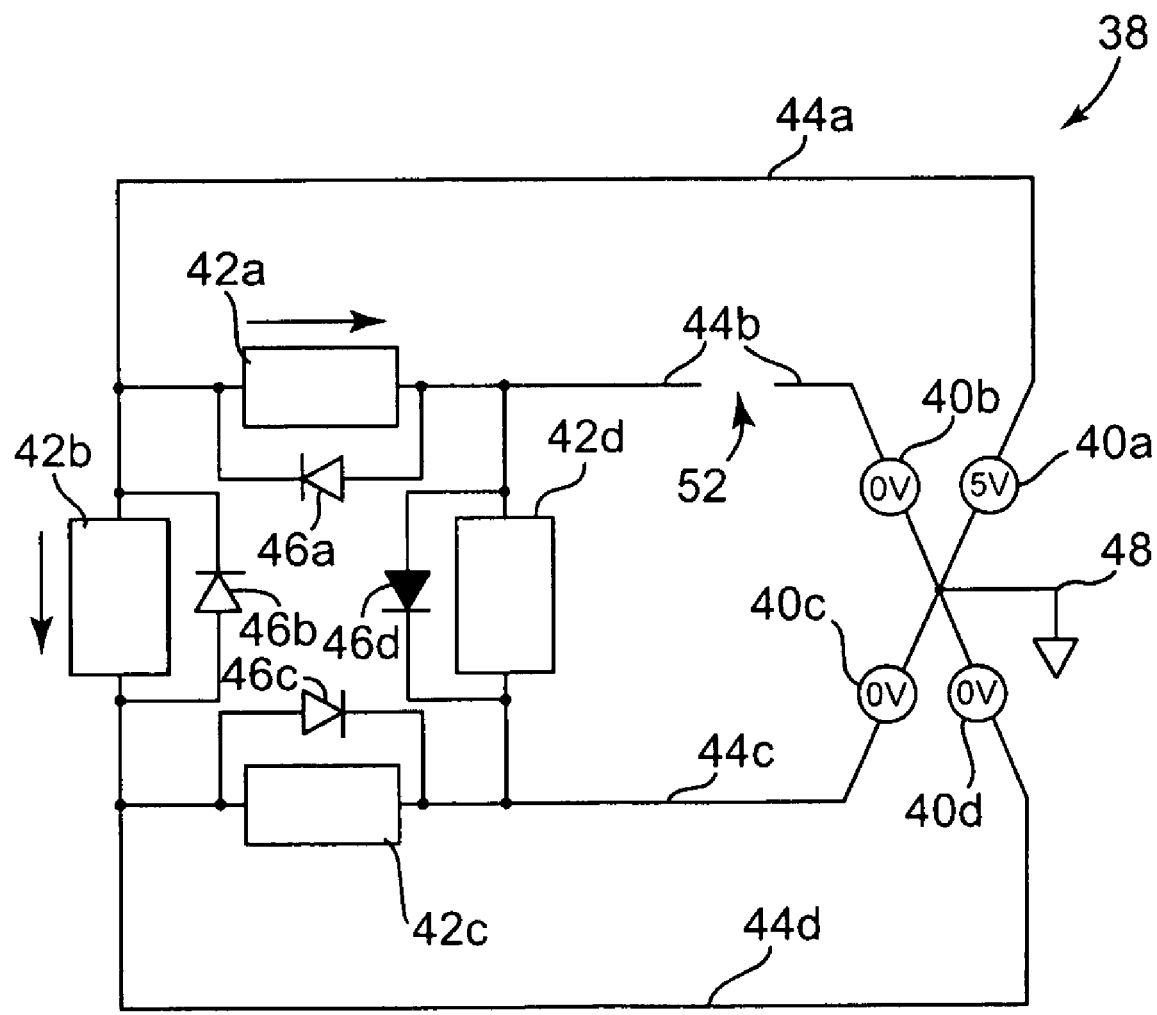
FIG. 7 is a diagram illustrating one embodiment of a circuit with an open supply conductor and supply circuits switched to power and obtain data from a third set of two sensors.

FIG. 7 is a diagram illustrating one embodiment of circuit 38, which is similar to circuit 38 of FIG. 2 with the exceptions that supply conductor 44b is open at 52 and supply circuits 40a-40d are switched to power and obtain data from sensors 42a and 42b. A control circuit, such as control circuit 22 (shown in FIG. 1), controls supply circuits 40a-40d to power and obtain data from sensors 42a and 42b.

To power sensor 42a, supply circuit 40a provides a high voltage of 5 volts to one side of sensor 42a via supply conductor 44a and supply circuit 40c provides a low voltage of 0 volts to sensors 42c and 42d via supply conductor 44c. Supply circuit 40d provides a low voltage of 0 volts to sensors 42b and 42c via supply conductor 44d, which puts 0 volts across sensor 42c from supply conductor 44c to supply conductor 44d. Diode 46a across the powered sensor 42a is reverse biased by the supply voltages and diode 46d is forward biased. Current flows through the powered sensor 42a in the direction indicated by the arrow and through diode 46d, from the high voltage of 5 volts at 44a to the low voltage of 0 volts at 44c. Sensor 42a provides data via modulation of current over the set of two supply conductors 44a and 44c. In one embodiment, the voltage drop across sensor 42a is substantially 4.5 volts and the voltage drop across diode 46d is substantially 0.5 volts.

To power sensor 42b, supply circuit 40a provides a high voltage of 5 volts to one side of sensor 42b via supply conductor 44a and supply circuit 40d provides a low voltage of 0 volts to the other side of sensor 42b via supply conductor 44d. Supply circuit 40c provides a low voltage of 0 volts to sensors 42c and 42d via supply conductor 44c, which puts 0 volts across sensor 42c from supply conductor 44c to supply conductor 44d. Diode 46b across the powered sensor 42b is reverse biased by the supply voltages and current flows through the powered sensor 42b in the direction indicated by the arrow, from the high voltage of 5 volts to the low voltage of 0 volts. Sensor 42b provides data via modulation of current over the set of two supply conductors 44a and 44d.

Thus, if one of the supply conductors 44a-44d is open, the control circuit controls supply circuits 40a-40d to power and obtain data from each of the sensors 42a-42d. In other embodiments, the number of sensors can be more or less than four sensors, and the resulting circuit is flexible enough to overcome an open supply conductor and obtain data from all of the sensors.

In circuit 38, each of the sensors 42 is electrically coupled to a different set of two of the supply conductors 44 and the number of sensors 42 is equal to the number of supply conductors 44. Circuit 38 includes four supply conductors 44 for powering and obtaining data from four sensors 42, which is a reduction of one half of the number of supply conductors or wires in a two wire per sensor system. Also, if one of the sensors 42 is shorted out in circuit 38, data can still be obtained from the remaining sensors 42 and if one of the supply conductors 44 is open in circuit 38, data can still be obtained from all of the sensors 42. In another embodiment, the number of sensors 42 can be reduced to three by removing one of the sensors 42 in circuit 38, where the number of supply conductors 44 remains at four and the number of supply conductors 44 is equal to one more than the number of sensors 42. In other embodiments, the number of sensors 42 can be any suitable number of sensors 42, where each of the sensors 42 is electrically coupled to a different set of two of the supply conductors 44 and the number of supply conductors 44 is either equal to the number of sensors 42 or one more than the number of sensors 42.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
   circuits that provide voltages;
   conductors that receive the voltages, wherein each of the conductors is connected to a different one of the circuits; and
   sensors configured to provide data, wherein each of the sensors receives two voltages via a different set of two of the conductors and provides data via the different set of two of the conductors and the number of conductors is equal to the number of sensors.

2. The system of claim 1, wherein the sensors include at least three sensors.

3. The system of claim 1, comprising:
   a control circuit configured to control the circuits to power the sensors and obtain data from powered sensors, wherein if one of the sensors is shorted, the control circuit is configured to control the circuits to power each remaining sensor of the sensors and obtain data from the powered sensors.

4. The system of claim 3, wherein:
the control circuit controls the circuits to provide substantially the same voltage on each conductor in the different set of two of the conductors that provide voltages to the one of the sensors that is shorted.

5. The system of claim 1, comprising:
a control circuit, wherein if one of the conductors is open, the control circuit is configured to control the circuits to power each of the sensors and obtain data from powered sensors.

6. The system of claim 5, wherein the control circuit controls the circuits to obtain data from each of two sensors connected to the one of the conductors that is open via different data retrieval operations.

7. The system of claim 1, wherein at least two of the sensors sense the same parameter and provide redundant data.

8. The system of claim 1, wherein each of the sensors provides data via current modulation over at least one conductor of the different set of two of the conductors.

9. The system of claim 1, wherein the sensors are at least one of steering angle sensors and steering incremental speed sensors.

10. A system comprising: circuits configured to provide supply voltages;
conductors configured to receive the supply voltages;
sensors configured to provide data, wherein each of the sensors is configured to receive the supply voltages via a different set of two of the conductors and provide data via the different set of two of the conductors and the number of conductors is equal to the number of sensors;
a control circuit, wherein, if one of the conductors is open, the control circuit is configured to control the circuits to power each of the sensors and obtain data from powered sensors and the control circuit controls the circuits to obtain data from each of two sensors connected to the one of the conductors that is open via different data retrieval operations; and
diodes coupled across the two sensors, wherein one of the diodes is coupled across one of the two sensors and another one of the diodes is coupled across another one of the two sensors, and the one of the diodes is reverse biased for the control circuit to obtain data from the one of the two sensors and forward biased via current that flows through the other one of the two sensors for the control circuit to obtain data from the other one of the two sensors.

11. The system of claim 10, wherein the one of the diodes and the one of the two sensors are on the same integrated circuit chip.

12. The system of claim 11, wherein the one of the diodes is a substrate diode that uses the substrate as one of an anode and a cathode.

13. A system comprising:
circuits that provide voltages;
conductors that receive the voltages; and
at least three sensors configured to provide data, wherein each of the at least three sensors receives two of the voltages via a different set of two of the conductors and the number of conductors is equal to the number of sensors.

14. The system of claim 13, comprising:
a control circuit, wherein, if one sensor of the at least three sensors is shorted, the control circuit is configured to switch the circuits to power each remaining sensor of the at least three sensors and obtain data from powered sensors.

15. The system of claim 13, comprising:
a control circuit, wherein, if one of the conductors is open, the control circuit is configured to switch the circuits to power each of the at least three sensors and obtain data from powered sensors.

16. The system of claim 13, wherein the at least three sensors provide data for at least one of vehicle stability control and electronic power steering.

17. A method of sensing comprising:
providing voltages via circuits;
receiving the voltages at conductors that are each connected to a different one of the circuits;
receiving the voltages at sensors via the conductors that are equal in number to the number of sensors;
powering each of the sensors via a different set of two of the conductors; and
transmitting data from each powered sensor via the different set of two of the conductors.

18. The method of claim 17, wherein, if one of the sensors is shorted, powering each of the sensors comprises:
controlling the circuits to provide the voltages via the conductors and power each remaining sensor of the sensors to obtain data from powered sensors.

19. The method of claim 17, wherein, if one of the conductors is open, powering each of the sensors comprises:
controlling the circuits to bypass the open conductor and power each of the sensors to obtain data from powered sensors.

20. The method of claim 17, wherein transmitting data from each powered sensor comprises:
modulating current over at least one conductor of the different set of two of the conductors.

21. A method of sensing comprising:
providing voltages via circuits;
providing the voltages to at least three sensors via conductors that are equal in number to the number of sensors;
powering each of the at least three sensors via a different set of two of the conductors; and
transmitting data from each powered sensor via the different set of two of the conductors.

22. The method of claim 21, wherein, if one of the at least three sensors is shorted, powering each of the sensors comprises:
switching the circuits to provide the voltages and power each remaining sensor of the at least three sensors and obtain data from powered sensors.

23. The method of claim 21, wherein, if one of the conductors is open, powering each of the sensors comprises:
switching the circuits to bypass the open conductor and power each of the at least three sensors and obtain data from powered sensors.

* * * * *